United States Patent [19]

Maricle

[11] 4,128,701
[45] Dec. 5, 1978

[54] HYDROGEN/CHLORINE REGENERATIVE FUEL CELL

[75] Inventor: Donald L. Maricle, Glastonbury, Conn.

[73] Assignee: United Technologies Corp., Hartford, Conn.

[21] Appl. No.: 863,816

[22] Filed: Dec. 23, 1977

[51] Int. Cl.² ............................................. H01M 8/18
[52] U.S. Cl. ...................................... 429/21; 429/29; 429/40; 429/70; 429/101
[58] Field of Search ...................... 429/21, 29, 40, 41, 429/46, 67, 70, 101, 199, 200, 105

[56] References Cited

U.S. PATENT DOCUMENTS

| | | | |
|---|---|---|---|
| 2,921,110 | 1/1960 | Crowley et al. | 429/29 |
| 2,921,111 | 1/1960 | Crowley et al. | 429/67 X |
| 3,416,966 | 12/1968 | Oswin | 429/21 |
| 3,421,994 | 1/1969 | Leduc | 429/29 X |
| 3,546,020 | 12/1970 | Berger | 429/40 X |
| 3,739,573 | 6/1973 | Giner | 429/29 X |
| 3,909,297 | 9/1975 | Zeitner, Jr. et al. | 429/29 |

Primary Examiner—Charles F. Lefevour
Attorney, Agent, or Firm—Charles A. Warren

[57] ABSTRACT

A regenerative fuel cell in which the reactive gases are hydrogen and chlorine and the electrolyte is an aqueous solution of a conductive salt or acid in which hydrogen chloride gas is soluble.

13 Claims, 1 Drawing Figure

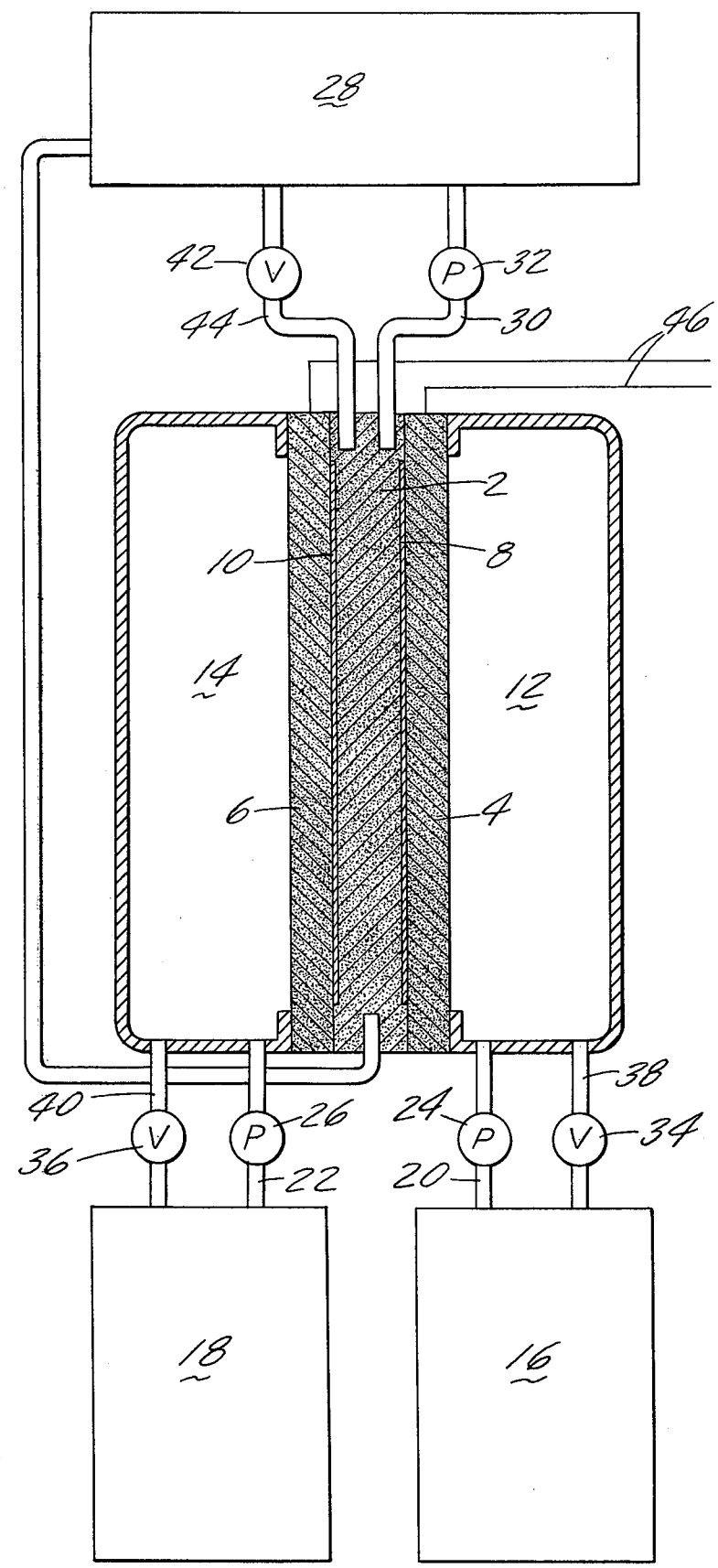

HYDROGEN/CHLORINE REGENERATIVE FUEL CELL

BACKGROUND OF THE INVENTION

Regenerative fuel cells for energy storage are well known, commonly using hydrogen and oxygen as the reacting gases. These cells have several disadvantages, the principal one being that the high overvoltage for the oxygen reaction in either direction, charge or discharge, limits the energy storage efficiency to about 55 to 60% compared to energy storage efficiency of secondary batteries of about 70%. The high overvoltage also causes severe corrosion of catalysts and support materials limiting the life of the cathode. This corrosion may well require separate fuel cells for charge and discharge.

SUMMARY OF THE INVENTION

An important feature of the present invention is a regenerative cell using hydrogen and chlorine as the reactive gases. With appropriate catalysts, the lower overvoltage for chlorine makes the cell substantially more reversible and minimizes corrosion problems. Energy efficiencies can be expected in the 70% range.

According to the invention, the fuel cell is made up of electrodes having catalyst coatings suitable for the hydrogen and chlorine reaction and having as an electrolyte an aqueous solution of a conductive salt or acid that readily absorbs the gaseous hydrogen chloride resulting from the cell discharge. This makes possible the use of the same cell for charge and discharge without any excessive overvoltages to affect catalyst stability or to produce excessive corrosion. A suitable conductive salt or acid is selected for the electrolyte so as to control the solubility of the chlorine, thereby minimizing a direct chemical reaction with the hydrogen and producing a maximum electrochemical reaction with the hydrogen.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The single FIGURE is a diagrammatic sectional view through a fuel cell embodying the invention.

DESCRIPTION OF THE PREFERRED EMBODIMENT

The cell to which the invention is applied is shown diagrammatically in the drawing. As shown, the cell includes a matrix 2 which is porous and which supports the electrolyte. This latter is an aqueous solution of an acid capable of dissolving or adsorbing the hydrogen chloride gas produced by the fuel cell discharge. This may be an aqueous solution of hydrogen chloride gas in water and this solution becomes stronger with cell discharge and weaker with cell recharge as will become apparent.

Instead of an acid electrolyte, it may be desirable to utilize a conductive salt dissolved in water. For example, a chloride salt, such as sodium chloride, may be preferred to the acid solution. These salts serve to control better, in some instances, the solubility of the chlorine ($Cl_2$) in the electrolyte by the formation of $Cl_3^-$, $Cl_5^-$ in solution; and, in this way, minimizes concentration polarization losses at the chlorine electrode while avoiding excess chlorine solubility which would favor self-discharge of the cell due to direct chemical reaction of the dissolved $Cl_2$ with hydrogen ($H_2$). These salts also serve to improve the conductivity of the electrolyte, reducing ohmic losses in the cell.

On opposite sides of the matrix are the electrodes 4 and 6 which are a porous gas diffusion material, as for example powdered and compressed carbon or graphite formed into a thin plate, or alternatively, a carbon or graphite paper using a fibrous form of the graphite as for example in U.S. Pat. No. 3,972,735. The same material may be used for both electrodes or for example the chlorine electrode, the cathode may be a titanium screen or other material having the desired porosity and capable of supporting the catalyst layer. On the face of the hydrogen electrode 4, the anode, is a catalyst layer 8 preferably platinum supported on carbon black placed thereon to function with the anode as a gas diffusion electrode. These catalyst layers may be formed and used as described in U.S. Pat. No. 4,028,274.

The chlorine electrode 6, the cathode, also has a catalyst layer 10 on the side against the matrix and this catalyst is preferably ruthenium oxide suitably applied so as to form a gas diffusion cathode.

As an alternative to the graphite electrode the cathode 6 may be, as above stated, a titanium screen on which the catalyst is placed. The prime purpose of the electrode is to support the catalyst and allow a passage of the reactive gas through the electrode to contact the electrolyte and to prevent escape of the fluid electrolyte from the matrix through the electrode. Thus the size of the screen, that is, the voids or spaces between the wires of the screen must be selected to accomplish the necessary results.

Against the outside surfaces of the electrodes are chambers 12 and 14, the chamber 12 being supplied with hydrogen under pressure and the chamber 14, against the cathode being supplied with chlorine gas under pressure. These gases may be supplied in any suitable manner, for example a hydrogen tank 16 and a chlorine tank 18 may be provided; and gas under pressure from these tanks is delivered through conduits 20 and 22 to the hydrogen and chlorine chambers, respectively.

Although they may not be needed during cell discharge, these conduits have pressure pumps 24 and 26, respectively, for pumping the respective gases into the tanks under pressure from the chambers during cell recharging when as will be apparent these gases are evolved from the electrodes during the charging process.

It is also desirable to have a tank 28 for the aqueous electrolyte. This tank communicates with the matrix by way of a conduit 30 and a pump 32 controls the desired flow of electrolyte into and out of the cell during discharge and recharge, respectively. Desirably the electrolyte will be circulated through a loop 33 during both charge and discharge of the cell. Because of the heat evolved during discharge, suitable heat exchangers may be necessary to cool the electrolyte. Also heaters may be necessary to maintain the gases in gaseous condition during expansion into the chambers during the discharge process.

For best efficiency, it is desirable to optimize the heat transfer from the heat exchangers to the heaters to minimize heat losses and thereby increase the total cell efficiency. Thus a suitable heat exchange fluid could be circulated between the heat exchangers (the coolers) for the electrolyte and the heaters for the gases.

The opposite may be necessary during recharge. That is to say, heaters for heating the aqueous electrolyte and heat exchangers or coolers for the evolved gases may be necessary. Again, for best efficiency, there would be desirably a heat transfer from the coolers to the heaters. It may also be necessary to have pressure control valves 34 and 36 on supply conduits 38 and 40 leading from the gas storage tanks to the cell chambers for controlling the gas pressures in the chambers during the discharge of the cell. A similar pressure control valve 42 may be necessary on a supply conduit 44 from tank 28 to the matrix. These devices are not a part of the present invention and need no detailed description; their use in other types of regenerative cells is well known.

The cell reaction for this cell during charge is

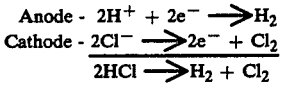

On discharge the reaction is

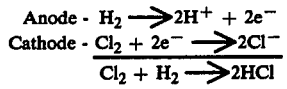

Obviously in charging or recharging the reaction occurs through the input of electrical energy from a source with a basic voltage of 1.36 volts. During discharge the cell produces electrical energy at the same basic voltage. Although a simple fuel cell has been described it will be apparent that a stack of cells may be assembled to produce the desired voltage for effective use. This stacking of cells is well known in the art.

The cell described is a relatively simple cell to produce and the necessary materials, in the amount needed are relatively inexpensive per cell so that the total cost per kilowatt hour is within a practical amount.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A regenerative fuel cell including:
   a matrix;
   an electrode on each side of the matrix;
   container means external to the cell for separately containing hydrogen gas and chlorine gas;
   means for supplying the hydrogen gas and chlorine gas from said container means to the electrodes on the sides opposite the matrix, one gas to each electrode;
   an aqueous electrolyte selected from the group consisting of sodium chloride and hydrochloric acid in said matrix in which the hydrogen chloride gas evolved is dissolved; and 2. A regenerative fuel cell as in claim 1 in which the aqueous electrolyte is hydrochloric acid.

3. A regenerative cell as in claim 1 in which the means for supplying the hydrogen and chlorine gases to the electrodes include a pressure control valve to supply gas from each container means to the cell at a selected pressure.

4. A regenerative cell as in claim 1 in which the means for supplying the hydrogen and chlorine gases to the electrodes includes pump means for pumping the gases from the cell to the container means during charging of the cell.

5. A regenerative cell as in claim 4 including means for circulating electrolyte between the electrolyte container and the matrix.

6. A fuel cell capable of being recharged after discharge including:
   opposed electrodes for the cell;
   a matrix between the electrodes;
   an aqueous electrolyte selected from the group consisting of sodium chloride and hydrochloric acid in said matrix;
   chambers on the sides of the electrodes opposite to the matrix;
   tanks external to the cell for both hydrogen and chlorine gas;
   means for supplying the hydrogen and chlorine gas, respectively, to said chambers for contact with the associated electrodes during discharge and for removing the gases from said chambers during charge or recharge of the cell;
   a container external to the cell and connected to the matrix for the electrolyte; and
   means for circulating the electrolyte to and from the container to the matrix.

7. A fuel cell as in claim 6 in which each electrode has a catalyst on the surface adjacent the matrix, and the electrolyte is hydrochloric acid.

8. A fuel cell as in claim 6 in which each electrode has a catalyst on the surface adjacent the matrix and the electrolyte is a chloride salt.

9. A fuel cell as in claim 6 in which there is a platinum catalyst on the hydrogen electrode and a ruthenium oxide catalyst on the chlorine electrode.

10. A regenerative fuel cell capable of being charged or recharged after discharge including;
    spaced opposed electrodes for the cell;
    an aqueous electrolyte selected from the group consisting of sodium chloride and hydrochloric acid in the space between the electrodes;
    chambers on the sides of the electrodes opposite to the electrolyte;
    a container external to the cell and connected to the fuel cell for the electrolyte;
    means for circulating the electrolyte to and from the container to the fuel cell;
    tanks external to the cell for hydrogen and chlorine gas; and
    means for supplying the hydrogen and chlorine from the tanks to the chambers, one gas to each electrode during discharge, and for receiving gas from said chambers during charge or recharge.

11. A fuel cell as in claim 10 in which there is a platinum catalyst on the hydrogen electrode and a ruthenium oxide catalyst on the chlorine electrode.

12. A fuel cell as in claim 10 in which said supplying means includes pumps for pumping the gases from the chambers to the tanks during a charging cycle.

13. A fuel cell as in claim 10 including a container external to the cell and connected to the space between the electrodes to receive electrolyte from said space and to return electrolyte to said space.

* * * * *

UNITED STATES PATENT AND TRADEMARK OFFICE
CERTIFICATE OF CORRECTION

PATENT NO. : 4,128,701
DATED : December 5, 1978
INVENTOR(S) : Donald L. Maricle

It is certified that error appears in the above-identified patent and that said Letters Patent are hereby corrected as shown below:

Claim 1 should read as follows:

1. A regenerative fuel cell including:
a matrix;
an electrode on each side of the matrix;
container means external to the cell for separately containing hydrogen gas and chlorine gas:
means for supplying the hydrogen gas and chlorine gas from said container means to the electrodes on the sides opposite the matrix, one gas to each electrode;
an aqueous electrolyte selected from the group consisting of sodium chloride and hydrochloric acid in said matrix in which the hydrogen chloride gas evolved is dissolved; and
a container external to the cell to receive electrolyte from the matrix and to return electrolyte to the matrix.

Signed and Sealed this

Tenth Day of July 1979

[SEAL]

Attest:

LUTRELLE F. PARKER
Attesting Officer    Acting Commissioner of Patents and Trademarks